Patented Apr. 14, 1953

2,635,092

UNITED STATES PATENT OFFICE 2,635,092

COPOLYMERS OF ACRYLONITRILE AND AN ALLYL OR METHALLYL ESTER OF A MONO-HALOGEN SUBSTITUTED, SATURATED, ALIPHATIC, MONOCARBOXYLIC ACID

George E. Ham, Dayton, Ohio, assignor, by mesne assignments, to The Chemstrand Corporation, a corporation of Delaware No Drawing. Application October 22, 1949, Serial No. 123,093

7 Claims. (Cl. 260—85.5)

This invention relates to new copolymers having unusual fiber forming properties. More specifically the invention relates to acrylonitrile copolymers capable of being converted readily to dyeable general purpose fibers.

In copending application Serial No. 106,490 filed July 23, 1949, by George E. Ham, there are described and claimed methods of preparing dye receptive fiber forming copolymers of acrylonitrile and vinyl esters of halogen substituted carboxylic acids, by treating them with amines or ammonia. Although this method produces good fibers the yield in the polymerization step is lowered due to the loss of vinyl chloroaceate through hydrolysis. Furthermore, the acetaldehyde formed by the hydrolysis acts as a chain terminator and complicates the development of desirable molecular weight compositions.

The primary purpose of this invention is to provide a method of preparing fibers of improved dye receptivity. A further purpose is to provide a method of converting acrylonitrile polymers into dye receptive polymers by an efficient economical procedure. A further purpose is to provide copolymers of acrylonitrile of desirable uniform high molecular weight.

In accordance with this invention it has been found that copolymers of acrylonitrile and allyl esters of halogen substituted monocarboxylic acids having up to eight carbon atoms can be prepared and converted readily into valuable dye receptive polymers by reaction with amines or ammonia. The useful copolymers are those of 75 to 98 percent by weight of acrylonitrile and from two to 25 percent of the allyl ester. Since the copolymers of more than 95 percent acrylonitrile are not optimum with respect to dye affinity, and since the copolymers having less than 80 percent acrylonitrile do not possess the optimum fiber properties, the preferred copolymers are those of 80 to 95 percent acrylonitrile and from five to 20 percent of the allyl ester.

Suitable esters for the practice of this invention are the allyl or methallyl haloacetates, preferably allyl chloroacetate, the allyl bromopropionates, methallyl chloroacetate, the allyl chlorobutyrates, the allyl chlorohexoates and the homologous allyl and methallyl esters of the chlorine or bromine substituted carboxylic acids.

The halogen substituent may be chlorine or bromine, and the substituent may be in any position on the aliphatic chain. For obvious reasons the preferred single compound is an allyl α-chloroacetate.

The new copolymers of acrylonitrile and the allyl ester of the halogen substituted carboxylic acids may be prepared by any polymerization procedure, but the preferred practice utilizes modified emulsion polymerization procedures wherein the copolymer is prepared in finely divided solid form for immediate use in the fiber operations. The preferred emulsion polymerization may utilize batch procedures wherein the monomers are charged with an aqueous medium containing the necessary catalysts and dispersing agents. A more desirable method involves the semi-continuous procedure, in which the polymerization reactor containing the aqueous medium is charged with the desired monomers gradually throughout the course of the reaction. Entirely continuous methods may also be used in which the monomers are gradually introduced to the reactor and the copolymers removed continuously.

The polymerization is catalyzed by means of any water soluble peroxy compound, for example sodium peroxide, hydrogen peroxide, sodium perborate, the sodium salts of other peroxy acids, the potassium, ammonium and other water soluble salts of peroxy acids, and any other water soluble compound containing a peroxy group (—O—O—). A wire variation in the quantity of peroxy compound is possible. For example, from 0.1 to 3.0 percent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

Although the uniform distribution of the reaction throughout the reaction mass can be achieved by vigorous agitation, it is generally desirable to promote the uniform distribution of reagents by using wetting agents, or emulsion stabilizers. Suitable reagents for this purpose are the water soluble salts of fatty acids, such as sodium oleate and potassium stearate, mixtures of water soluble fatty acid salts, such as common soaps prepared by the saponification of animal and vegetable oils, the "amino soaps," such as salts of triethanolamine and dodecylmethylamine, salts of rosin acids and mixtures thereof, the water soluble salts of half esters of sulfuric acid and long chain alkyl alcohols, sulfonated hydrocarbons, such as alkyl aryl sulfonates, and any other of the wide variety of wetting agents, which are in general organic compounds containing both hydrophobic and hydrophilic radicals. The quantity of emulsifying agent will depend upon the particular agent selected, the ratio of monomer to water being used, and the conditions of polymerization. In general, however, from 0.01 to one percent by weight of the monomers may be employed.

The preferred methods of operation are those which produce a copolymer of very uniform chemical and physical properties. Other characteristics of the copolymer are frequently of great importance, for example the particle size of the dispersion which is primarily concerned with the ease of filtration, the water to monomer ratio which must necessarily be low for the most economical production, and the yield and conversion of the monomers to copolymer.

The emulsion polymerizations are preferably conducted in glass or glass-lined vessels which are provided with a means for agitating the contents. Generally rotary stirring devices are the most effective means of insuring the intimate contact of the reagents, but other methods may be successfully employed, for example by rocking or tumbling the reactors. The polymerization equipment generally used is conventional in the art and the adaptation of a particular type of apparatus to the reaction contemplated is within the province of one skilled in the art.

The optimum polymerizations for fiber formation involve the use of polymerization regulators to prevent the formation of polymer units of excessive molecular weight. Suitable regulators are the alkyl and aryl mercaptans, carbon tetrachloride, chloroform, dithioglycidol and alcohols. The regulators may be used in amounts varying from .001 to two percent on the weight of the monomer to be polymerized.

When the polymerization is complete the polymer is separated from the aqueous medium by any of the conventionally used methods. When the optimum procedures above described are used the polymer may be separated from the aqueous phase by filtration. The resulting polymer in either case may require washing operations to remove traces of soluble catalyst or dispersing agent.

The solid granular copolymer of acrylonitrile and vinyl esters of α-chlorocarboxylic acid is useful in the preparation of fibers by conventional methods. The preferred practice involves the preparation of spinning solutions by dispersing the polymer in suitable solvents, for example N,N-dimethylformamide, N,N-dimethylacetamide, gamma-butyrolactone and ethylene carbonate. The polymer solutions are fabricated into fibers by extrusion through a suitable die, or a spinneret containing a plurality of minute apertures, into a medium which removes the solvent and causes the polymer to precipitate in a continuous linear form. The said medium may be a liquid, for example water, or aqueous solutions of acids, bases, or salts, or it may be a gas, for example air or any gas which is inert with respect to the polymer.

The intermediate polymers are rendered dye receptive by a chemical reaction involving the substitution of the α-chlorine atom with aqueous or gaseous ammonia or a primary, secondary or tertiary amine. Useful amines are the aliphatic amines, such as methylamine, n-butylamine, ethylene diamine or ethanolamine, the aliphatic secondary amines, such as diethylamine, ethyl isopropylamine, dicyclohexylamine, and diethanolamine, the aliphatic tertiary amines, for example triethanolamine, triethylamine, trimethylamine, and hexamethylenetetramine; the various N-heterocyclic amines, for example pyridine and morpholine, and the various mixed amines, for example N-ethyltrimethylene diamine, diethylene triamine, triethylene tetramine, tetraethylene pentamine. The amine treatment which converts the intermediate copolymers into dye receptive new polymers may be conducted with the polymer in a granular solid state as obtained from the polymerization reaction. In this modification the polymer is heated with the amine for sufficient time to effect a substantial replacement of the chlorine atoms by the amine. When the reaction has been completed the excess amine may be removed by evaporation or by chemically binding it with a suitable reagent. The polymer is then dispersed in the solvent and the fiber spun in the usual manner.

If desired the new copolymer may be dissolved in the solvent before being treated with the amine. The solution is then mixed with sufficient amine to react with all or part of the available chlorine atoms. The fiber so spun has more desirable dyeing properties because in solution a larger proportion of the chlorine atoms is available for reaction.

A still further procedure involves the spinning of the new polymers in the conventional manner, followed by treatment of the fibers with the amine in order to substitute the amino groups for the available chlorine atoms of the polymer. This method may be preferred where spinning from relatively concentrated solutions is desired.

Further details of this invention are set forth with respect to the following examples.

*Example 1*

A 2-liter glass reactor provided with a reflux condenser, a dropping funnel and an efficient rotary stirring device, was charged with a mixture of 740 grams of water and 0.2 gram of the sodium salt of mahogany acids. A solution of one gram of potassium persulfate in 60 grams of water was separately prepared and approximately one-sixth of the solution was added to the reactor. The reactor was then heated to about 75° C., and then a mixture of 170 grams of acrylonitrile, 30 grams of allyl chloroacetate and 0.2 gram of tertiary dodecylmercaptan was gradually introduced at reflux temperature over a period of one and one-half hours. The balance of the catalyst was introduced in five equal portions at approximately twenty minute intervals. After all reactants had been added the mixture was refluxed for one-half hour and then steam distilled to remove 16 grams of unreacted monomers. The resultant polymer was filtered and dried to recover 178.5 grams of a copolymer containing 13.2 percent of allyl chloroacetate.

Synthetic fibers were spun from a 17 percent solution of this copolymer in dimethylacetamide into a mixture of 67 percent dimethylacetamide and 33 percent water through a 10-hole spinneret (.005 inch holes), washed with water and stretched 3.46 times in a steam atmosphere. Fibers were obtained of a tenacity of 3.8 grams per denier and boil shrinkage of 24.1 percent and were found to be incapable of accepting dye. An additional sample of the fiber was treated with ammonia gas at 105° C. for ten minutes. The resulting fiber in the form of a skein (one gram)

was treated for one hour at 100° C. with a solution prepared by mixing one milliliter of 2 percent Wool Fast Scarlet G Supra, 5 milliliters of 3 percent sulfuric acid and 40 milliliters of distilled water. The fibers were colored an intense shade of scarlet and 98 percent of the dye bath was exhausted.

*Example 2*

Using the procedure described in the preceding experiment, 368 grams of acrylonitrile and 32 grams of allyl α-chloroacetate were copolymerized. t-Dodecyl mercaptan (0.8 gram) was added to the monomer as a regulator. The resulting product was found to be a copolymer of 93.1 percent acrylonitrile and 6.9 percent allyl chloroacetate (nsp in 0.1 percent dimethylformamide equals 0.18). Fibers were prepared therefrom by spinning a 15 percent solution of the copolymer in dimethylacetamide into a spin bath containing 60 percent dimethylacetamide, 40 percent water, washing with water, and stretching 3.7 times in a steam tube. Fibers of a tenacity of 3.5 grams per denier, 7 to 9 percent elongation and 9 to 10 percent boil shrinkage were obtained which were capable of being converted to dyeable resins by reaction with ammonia or amines.

*Example 3*

Using the technique described in Example 1, 184 grams of acrylonitrile and 16 grams of methallyl chloroacetate were copolymerized. The product so obtained was found to be a copolymer of 93.3 percent acrylonitrile and 6.7 percent of methallyl chloroacetate. The polymer so produced was not dye receptive, but could be converted to dye receptive resins by reaction with ammonia or amines.

I claim:

1. A copolymer of 80 to 95 percent by weight of acrylonitrile and 5 to 20 percent of a compound of the group consisting of the methallyl and allyl esters of a mono-halogen substituted saturated aliphatic monocarboxylic acid containing up to eight carbon atoms, said halogen being selected from the group consisting of chlorine and bromine.

2. A copolymer of 80 to 95 percent by weight of acrylonitrile and 5 to 20 percent of a compound of the group consisting of the methallyl and allyl esters of a mono-haloacetic acid, wherein the halogen is selected from the group consisting of chlorine and bromine.

3. A copolymer of 80 to 95 percent by weight of acrylonitrile and 5 to 20 percent of a compound of the group consisting of the methallyl and allyl esters of a monochloro-substituted saturated aliphatic monocarboxylic acid.

4. A copolymer of 80 to 95 percent by weight of acrylonitrile and 5 to 20 percent of a compound of the group consisting of methallyl and allyl alpha-chloroacetate.

5. The method of preparing copolymers of 80 to 95 percent of acrylonitrile and 5 to 20 percent of a compound of the group consisting of the methallyl and allyl esters of a mono-halogen substituted saturated aliphatic monocarboxylic acid containing up to eight carbon atoms, said halogen being selected from the group consisting of chlorine and bromine, which comprises contacting the monomers in an aqueous medium in the presence of a water-soluble peroxide catalyst at a temperature between 60° C. and 90° C., and separating the resulting copolymer.

6. The method of preparing copolymers of 80 to 95 percent of acrylonitrile and five to 20 percent of allyl chloroacetate, which comprises contacting the monomers in an aqueous medium in the presence of a water soluble peroxide catalyst at a temperature between 60° C. and 90° C. and separating the resulting copolymer.

7. The method of preparing copolymers of 80 to 95 percent of acrylonitrile and five to 20 percent of methallyl chloroacetate, which comprises contacting the monomers in an aqueous medium in the presence of a water soluble peroxide catalyst at a temperature between 60° C. and 90° C. and separating the resulting copolymer.

GEORGE E. HAM.

References Cited in the file of this patent

UNITED STATES PATENTS

| Number | Name | Date |
| --- | --- | --- |
| 2,332,900 | D'Alelio | Oct. 26, 1943 |
| 2,436,926 | Jacobson | Mar. 2, 1946 |

FOREIGN PATENTS

| Number | Country | Date |
| --- | --- | --- |
| 116,812 | Australia | Apr. 8, 1943 |